May 3, 1938.   C. H. BOCK   2,115,984

LUBRICATING DEVICE

Filed March 4, 1936   2 Sheets-Sheet 1

INVENTOR
CLARENCE H. BOCK.
BY
ATTORNEY

Patented May 3, 1938

2,115,984

UNITED STATES PATENT OFFICE 2,115,984

LUBRICATING DEVICE

Clarence H. Bock, Detroit, Mich., assignor to The Lubrication Corporation, Chicago, Ill., a corporation of Delaware Application March 4, 1936, Serial No. 67,104

4 Claims. (Cl. 285—143)

This invention relates to lubricating devices and more particularly to lubrication couplings adapted for clamping engagement with lubricant receiving fittings.

In servicing a machine provided with lubricant receiving fittings permanently or semi-permanently connected to machine parts to be lubricated, it is desirable to provide clamping engagement between the fittings and the couplers or nozzles utilized to conduct lubricant thereinto. Otherwise, it is difficult, particularly where relatively high pressures are employed, to maintain the coupler or nozzle in sealing engagement with the fitting. Various couplers have been proposed for this purpose but they have been in general complicated and expensive to construct, and it is accordingly an object of the present invention to provide a lubrication coupler which is simple and inexpensive to construct and at the same time positive and reliable in operation.

Another object of the invention is to provide a coupler having a transverse opening therein to receive the fitting head whereby the coupler may be slipped over the fitting transversely.

Another object is to provide a coupler which may be used interchangeably with any one of a plurality of different types of fittings.

Other objects, advantages and novel features of the invention will be apparent from the following description when read in connection with the accompanying drawings; in which Fig. 1 is an axial section of a lubrication coupler embodying the invention;

Figure 1:
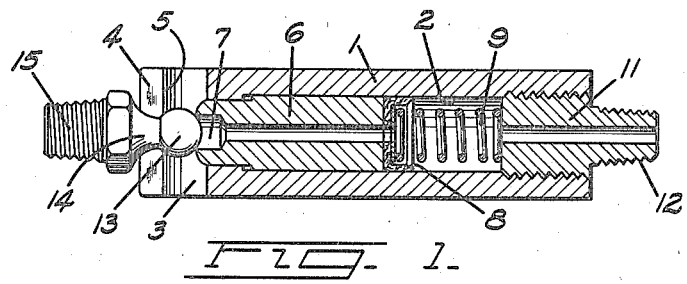
Figure 2:
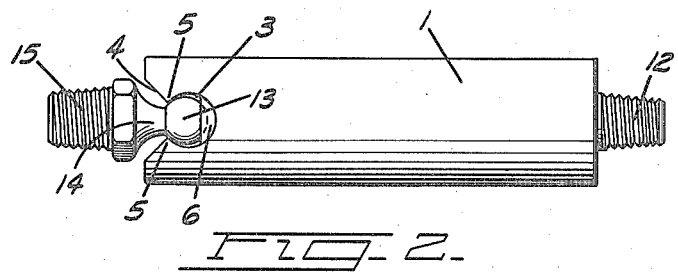
Fig. 2 is a side view at right angles to Fig. 1.

The coupler of Figs. 1 and 2 comprises a tubular body member 1 having an axial cylindrical bore 2 therethrough and a transverse bore 3 formed adjacent one end thereof. A slot 4 is formed in the end of the body 1 and communicates with the transverse bore 3, the slot being of less width than the diameter of the bore 3 to provide inwardly projecting lips 5.

A plunger 6 is slidably mounted in the bore 2 and is formed at one end with discharge orifice 7, the walls of which are shaped for sealing engagement with a fitting. Preferably the rear face of the plunger 6 carries a cup leather 8 for preventing leakage of lubricant past the plunger and a compression spring 9 urges the plunger forwardly in the bore 2. The spring 9 seats at one end on the cup leather 8 to hold it in place and at its opposite end on a plug 11 which is screw threaded into the end of the bore 2. The plug 11 has a threaded extension 12 which is adapted for connection to a source of lubricant under pressure such as a grease gun or the like.

The coupling is shown engaged with a fitting of the type more particularly described and claimed in the patent to Morris No. 1,962,254. This fitting has a ball head 13 connected by a reduced neck 14 to a shank 15 which is adapted for connection to a machine part to be lubricated. It will be apparent that fittings of various other types and forms might be employed in place of the particular fitting illustrated.

In order to connect the coupler to the fitting, the end of the transverse bore 3 may be placed in alignment with the fitting head 13 with the slot 4 similarly aligned with the fitting neck 14. If the coupler is then moved transversely relative to the fitting, the fitting head will enter the bore 3 engaging the end of the plunger 6 and camming it back against the action of the spring 9 until the fitting and coupler occupy the relative positions shown in Figs. 1 and 2.

If lubricant under pressure is forced into the nipple 12 and bore 2, it will exert a pressure against the end of the plunger 6 which together with the force of the spring 9 will urge the outlet orifice 7 tightly against the fitting head to form a seal therewith. It will be noted that the inwardly projecting lips 5 engage the rearward portion of the fitting head and prevent the fitting from slipping out of the coupler. Lubricant under pressure will flow through the bore in the plunger 6 and through the fitting to the parts to be lubricated. After a sufficient quantity of lubricant has been forced through the fitting, pressure on the plunger 6 may be relieved by any suitable type of relief valve, not shown, or by pressing the coupler toward the fitting to move the plunger 6 rearwardly in the bore 2, lubricant in the bore 2 being displaced by the plunger and forced into the fitting during this operation. The coupler may then be moved transversely relative to the fitting to slide the fitting head out the end of the bore 3.

It will be noted that with the coupler in clamping engagement with the fitting, the coupler may be moved substantially universally without breaking the seal. During such movement the edges of the discharge orifice 7 will slide over the spherical fitting surface and the fitting surface will slide similarly over the lips 5. Such movement is limited only by the size of the discharge orifice 7 and by engagement of the end of the coupler with the fitting or with parts adjacent to the fitting.

Figure 3:
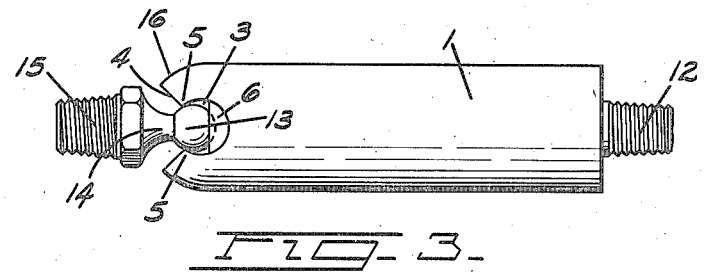
Fig. 3 is a view similar to Fig. 2 showing a modified construction.
Figure 4:
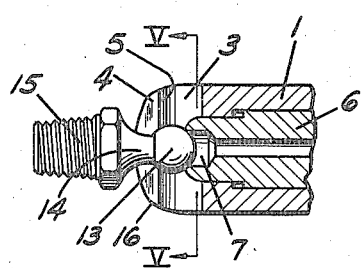
Fig. 4 is a partial axial section at right angles to Fig. 3.
Figure 5:
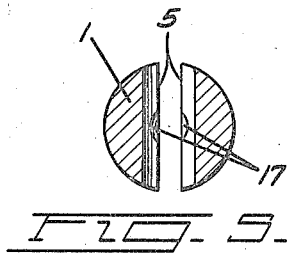
Fig. 5 is a section on the line V—V of Fig. 4.

Figs. 3, 4 and 5 illustrate a slightly modified construction and for purposes of brevity of description parts therein corresponding to like parts in Figs. 1 and 2 are indicated by the same reference numbers. In this embodiment the fitting engaging end of the coupler body 1 is rounded off as indicated at 16 into a substantially spherical or part-spherical form. With this arrangement a larger degree of universal movement between the fitting and coupler can be obtained before the coupler end will strike any part of the fitting.

Figs. 3 to 5 illustrate a further construction best seen in Fig. 5 in which the lips 5 are formed with spherical depressions 17 in the central portion thereof opposite the discharge orifice 7. The depressions 17 are adapted to receive the fitting head to assist in locating the same longitudinally of the bore 3 and further are shaped to conform substantially to the shape of the head 13 thereby to provide a larger bearing surface between the head 13 and the lips 5. Such depressions will not interfere with the universal movement of the coupler relative to the fitting.

The coupler of Figs. 6 to 9 is substantially similar to the couplers of Figs. 1 to 5 and parts therein corresponding to like parts in the preceding figures are indicated by the same reference numbers primed. The primary difference between the couplers of Figs. 6 to 9 and those of the preceding figures resides in the formation of the lips 5' which are adapted for engagement with any one of a plurality of different types of fittings. As shown, the lips 5' are formed with substantially flattened or squared end portions to provide for greater strength and to adapt them for engagement with fittings of different types.

Figure 6:
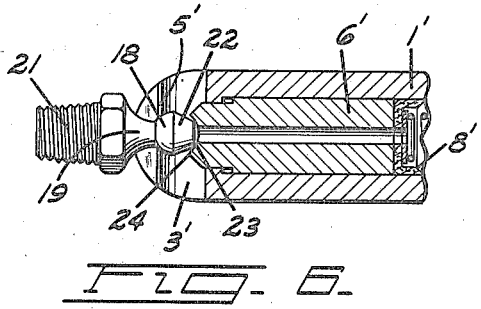
Fig. 6 is a partial section of a modified construction.
Figure 7:
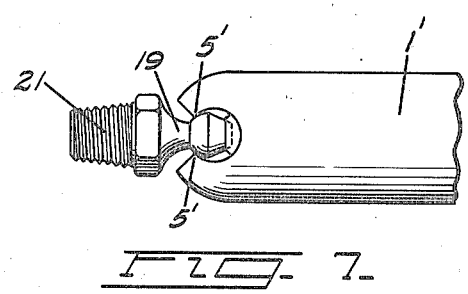
Fig. 7 is a side view at right angles to Fig. 6.

As shown in Figs. 6 and 7 the coupler may be applied to a fitting of the general type more particularly illustrated and claimed in the patent to Bock No. 2,019,289 in which the fitting head has a spherical portion 18 adjacent its point of connection to a reduced neck 19 which connects the head to the shank 21. The head is completed by a substantially truncated conical portion 22 terminating in a relatively sharp sealing edge for engagement with the nozzle discharge orifice. It will be noted that in the coupling of Figs. 6 to 9, the discharge orifice of the plunger 6' is formed with a concave spherical portion 23 having an annular edge 24.

In connecting the coupling to a fitting of the type illustrated in Figs. 6 and 7, the end of the bore 3' is placed over the head of the fitting and the coupler is moved transversely to cause the fitting to move to the center of the bore 3' as shown. During this movement the fitting head will engage the end of the plunger 6' and cam it backwardly to permit entrance of the fitting head into the discharge orifice as explained in connection with Figs. 1 and 2. It will be noted that with the fitting of Figs. 6 and 7 universal movement between the coupler and fitting is possible, the sealing edge of the fitting sliding over the spherical portion 23 of the coupler discharge orifice and maintaining a seal therewith. Preferably the discharge orifice 23 is formed with the same radius as the spherical portion 18 of the fitting in order to facilitate universal movement.

Figure 8:
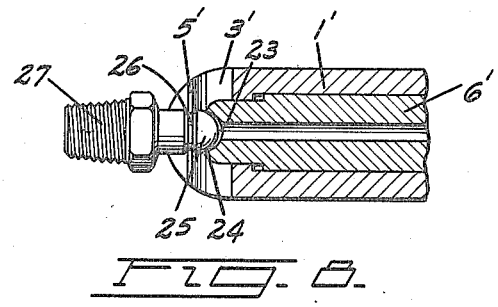
Figs. 8 and 9 are views corresponding to Figs. 6 and 7, respectively, illustrating the coupler used on a different type of fitting.
Figure 9:
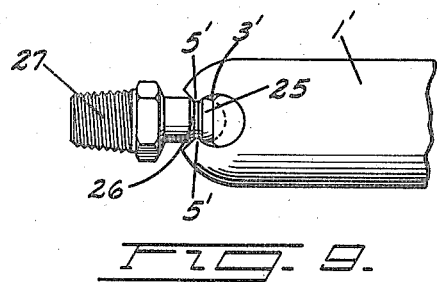

Figs. 8 and 9 illustrate the connection of the same coupler with a fitting of the type illustrated in the patent to Barks No. 2,010,174 which has a substantially semi-spherical head portion 25 and a reduced portion 26 connecting the head portion to a shank 27. As shown, the reduced portion 26 is in the form of a relatively narrow annular groove whose diameter is substantially equal to the space between the lips 5' and whose width is substantially equal to the width of said lips. With this construction the coupling may be moved transversely on to the fitting with the lips 5' entering the groove 26 and engaging behind the head 5 and with the annular edge 24 on the plunger 6' engaging and sealing against the head 5 to form a lubricant tight seal.

It will be understood that fittings of various shapes other than those illustrated might be serviced with the coupler of the present invention, either with a nozzle discharge orifice of the type shown or by providing a different discharge orifice of suitable shape. Obviously the nozzle discharge orifice shape and size and the relative shapes and sizes of the other parts might be changed to fit any desired size and shape of nipple without departing from the spirit of the invention and it is not intended to be limited in these or other respects to the forms shown or otherwise than by the terms of the appended claims.

I claim:

1. A lubrication coupler comprising, a body formed with a longitudinal bore and having a transverse bore therethrough adjacent one end, said body having a transverse slot of less width than the transverse bore extending across said one end and communicating with the transverse bore whereby a lubricant fitting may be engaged by the coupler with its head portion in the transverse bore and its neck portion extending through said slot.

2. A lubrication coupler comprising, a body formed with a longitudinal bore and having a transverse bore therethrough adjacent one end, said body having a transverse slot of less width than the transverse bore extending across said one end and communicating with the transverse bore whereby a lubricant fitting may be engaged by the coupler with its head portion in the transverse bore and its neck portion extending through said slot, and a fitting engaging member slidably mounted in the longitudinal bore and having a discharge orifice formed for sealing engagement with the fitting head.

3. A lubrication coupler comprising, a body formed with an axial cylindrical bore and a transverse cylindrical bore adjacent one end, there being a slot in said end of less width than the diameter of the transverse bore, said slot communicating with the transverse bore whereby a fitting head may be inserted in the transverse bore with the fitting neck extending through the slot, the walls of said transverse bore being formed with locating depressions to receive and to locate the fitting head.

4. A lubrication coupler comprising, a body formed with an axial cylindrical bore and a transverse cylindrical bore adjacent one end, there being a slot in said end of less width than the diameter of the transverse bore, said slot communicating with the transverse bore whereby a fitting head may be inserted in the transverse bore with the fitting neck extending through the slot, and a plunger slidable in said axial bore and having a discharge orifice formed for sealing engagement with the fitting head, the walls of said transverse bore being formed with locating depressions substantially alined with the discharge orifice for receiving and locating the fitting head.

CLARENCE H. BOCK.